United States Patent [19]

Imataki et al.

[11] Patent Number: 5,389,313
[45] Date of Patent: Feb. 14, 1995

[54] METHOD OF PRODUCING A MOLDING DIE FOR AN INFORMATION RECORDING MEDIUM

[75] Inventors: Hiroyuki Imataki; Tetsuya Satoh; Mizuho Hiraoka, all of Kawasaki; Tomoyuki Tamura, Yokohama, all of Japan

[73] Assignee: Canon Kabushiki Kaisha, Tokyo, Japan

[21] Appl. No.: 994,358

[22] Filed: Dec. 21, 1992

Related U.S. Application Data

[60] Division of Ser. No. 811,900, Dec. 20, 1991, Pat. No. 5,234,633, which is a continuation of Ser. No. 718,906, Jun. 24, 1991, abandoned, which is a continuation of Ser. No. 657,388, Feb. 19, 1991, abandoned, which is a continuation of Ser. No. 290,640, Dec. 27, 1988, abandoned.

Foreign Application Priority Data

Dec. 28, 1987 [JP] Japan ................ 62-329680
Apr. 28, 1988 [JP] Japan ................ 63-103797

[51] Int. Cl.6 .................... B44C 1/22; B29D 17/00
[52] U.S. Cl. .................... 156/643; 156/628; 156/659.1; 156/646; 264/2.5; 264/107; 264/220; 425/810
[58] Field of Search .......... 264/106, 107, 219, 220, 264/1.3, 2.5; 425/810; 156/628, 630, 632, 643, 659.1, 660, 646; 427/155, 156

[56] References Cited

U.S. PATENT DOCUMENTS

| | | | |
|---|---|---|---|
| 4,230,915 | 10/1980 | Dil et al. | 369/275.3 |
| 4,408,319 | 10/1983 | Tsunoda et al. | 369/275 |
| 4,478,768 | 10/1984 | Takeoka | 264/1.4 |
| 4,565,772 | 1/1986 | Takeoka | 430/320 |
| 4,698,128 | 10/1987 | Berglund et al. | 156/659.1 |
| 4,723,903 | 2/1988 | Okazaki et al. | 425/810 |
| 4,734,157 | 3/1988 | Carbaugh et al. | 156/659.1 |
| 4,814,041 | 3/1989 | Auda | 156/659.1 |
| 4,869,777 | 9/1989 | Apschel et al. | 156/659.1 |
| 4,876,042 | 9/1990 | Imataki et al. | 425/385 |
| 4,933,318 | 6/1990 | Heijman | 156/659.1 |
| 4,953,385 | 9/1990 | Aoki et al. | 425/810 |
| 4,956,214 | 10/1989 | Imataki et al. | 264/39 |
| 5,007,984 | 4/1991 | Tsutsumi et al. | 156/659.1 |
| 5,024,722 | 6/1991 | Cathey, Jr. | 156/659.1 |
| 5,026,510 | 6/1991 | Yashima | 425/810 |
| 5,122,313 | 6/1992 | Yashima | 425/810 |
| 5,127,989 | 7/1992 | Haraguchi et al. | 156/659.1 |

FOREIGN PATENT DOCUMENTS

| | | |
|---|---|---|
| 0156372 | 10/1985 | European Pat. Off. |
| 2028705 | 10/1970 | France . |
| 2261860 | 9/1975 | France . |
| 1422508 | 2/1969 | Germany . |
| 61-51634 | 3/1986 | Japan ................ 264/106 |
| 1-312749 | 12/1989 | Japan ................ 264/107 |

OTHER PUBLICATIONS

IBM Technical Disclosure Bulletin, vol. 30, No. 5 (1987), 306:311.
Patent Abstracts of Japan, vol. 9, No. 111 (M-379) (1985).
Ahrens, Funkschau, No. 21 (1982), Herstellung einer LV-Bildplatte, 65:68.
M. Eichlseder, et al., Ind. Prod. Eng., vol. 11, No. 3 (1987), 150:151.

Primary Examiner—Jay H. Woo
Assistant Examiner—Duane S. Smith
Attorney, Agent, or Firm—Fitzpatrick, Cella, Harper & Scinto

[57] ABSTRACT

A method produces a molding die for an information recording medium, having a mold surface with a prescribed unevenness pattern comprising a projection; the projection having different etching velocities along its projected thickness; and defining a pair of convergent opposite inclining side slopes. Each slope of the pair forms an acute inclining angle with respect to extension of the mold surface. A pattern-forming layer is formed comprising a common metal element throughout its thickness and an additional element differing in composition from the common metal element in the thickness direction of the pattern-forming layer. The common metal element and the additional elements have different etching velocities in the thickness direction of the pattern-forming layer. The pattern-forming layer is selectively etched with a common etchant to form the projection.

5 Claims, 2 Drawing Sheets

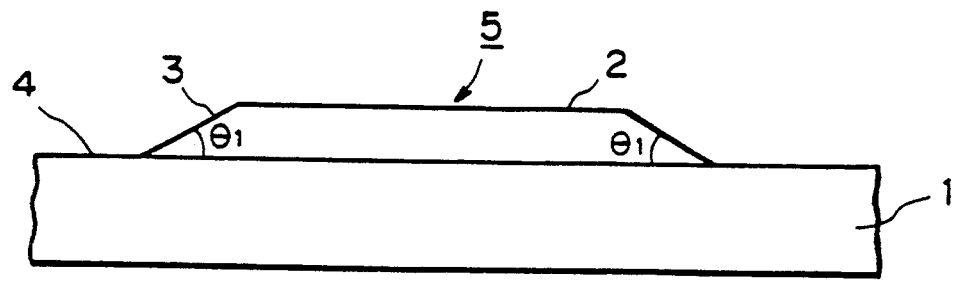
F I G. 1
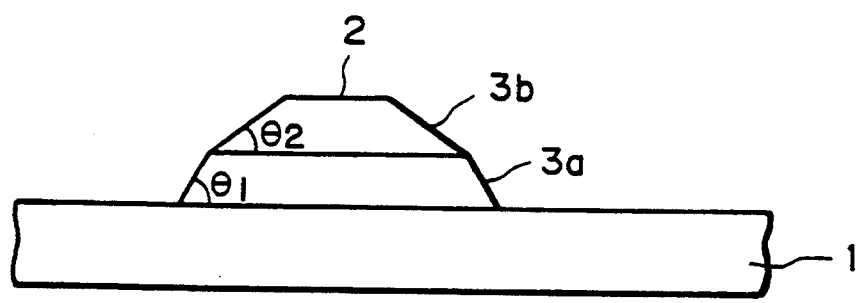
F I G. 2
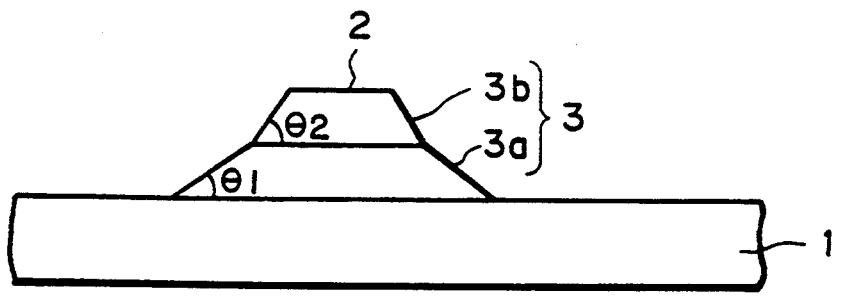
F I G. 3

METHOD OF PRODUCING A MOLDING DIE FOR AN INFORMATION RECORDING MEDIUM

This application is a division of application Ser. No. 07/811,900, filed Dec. 20, 1991, now U.S. Pat. No. 5,234,633, issued Aug. 10, 1992, which in turn is a continuation of application Ser. No. 07/718,906, filed Jun. 24, 1991, now abandoned, which in turn is a continuation of application Ser. No. 07/657,388, filed Feb. 19, 1991, now abandoned, which in turn is a continuation of application Ser. No. 07/290,640, filed Dec. 27, 1988, now abandoned.

FIELD OF THE INVENTION AND RELATED ART

The present invention relates to a cast molding die (or molding die for casting) for an information recording medium substrate, and a process for producing an information recording medium substrate using the cast molding die.

In the substrate for an information recording medium, an unevenness pre-format such as tracking groove and an information pit is formed on the information recording surface thereof. In order to form such unevenness on the substrate, there have been used (1) an injection molding process or hot pressing process wherein the tracking groove of a stamper pattern is transferred to the substrate, in the case of a substrate comprising a thermoplastic resin, (2) a so-called 2P process, or (3) a casting (or cast molding) process.

In the 2P process, a photo-curable (or photo-hardenable) resin composition is applied onto a transparent resin plate comprising a thermosetting resin or thermoplastic resin, the resultant substrate is caused to contact a stamper pattern, and an energy such as ultraviolet rays is uniformly supplied thereto from the transparent resin plate side to cure the above-mentioned photo-curable resin composition, whereby the pattern of the stamper is transferred to the transparent resin plate to form a replica thereof.

On the other hand, in the casting process, a monomer for a resin or a prepolymer containing a solvent is poured into a molding die wherein a pattern corresponding a tracking groove or an information pit has been preliminarily formed on one side or both sides, and then cured or hardened to obtain a molded product.

However, in the thermoplastic resin substrate obtained by the above-mentioned injection process or hot pressing process, residual stress or molecular orientation due to heat history causes warp or optical anisotropy in the substrate after the formation, whereby the resultant substrate for information recording medium becomes problematic. Further, in the substrate obtained by the 2P process, unreacted polymerization initiator and monomer are liable to remain, and they very often affect the optical recording layer of an information recording medium to cause deterioration in recording characteristics.

On the other hand, the cast molding process has been used in some cases as a process for producing an information recording medium substrate which is free of the above-mentioned problem. In this process, substantially no pressure is applied to the resultant substrate at the time of molding, and any of a thermoplastic resin, thermosetting resin, and a photocurable resin can be used as the resin for casting, whereby the resin can be so selected that it does not affect the resultant recording layer.

In the above-mentioned cast molding process, various dies have been used as those having an unevenness pattern corresponding to a tracking groove or information pit at the time of molding as follows: one obtained by forming a mask comprising a photoresist on a glass plate by a photolithographic process, etching a material by use of the mask to pattern it with an unevenness pattern corresponding to the mask; one obtained by patterning by use of laser beam machining such as cutting; one obtained by forming an unevenness pattern on a glass or metal plate by a direct-cutting method using a diamond needle with a point; etc.

However, the cast molding process requires a considerably long time for effecting one cycle of treatment when a substrate is produced, and therefore it requires a large number of cast molding dies in order to produce a large number of substrates. Accordingly, it is most preferred to produce a molding die by a photolithographic process.

Incidentally, the conventional cast molding die has generally been produced by forming a pre-format pattern comprising a photoresist on a metal film disposed on a die substrate by a photolithographic process, etching the metal film by using the thus formed resist pattern as a mask thereby to form an unevenness pre-format pattern. In this conventional process, the metal film disposed on the die substrate is etched at a uniform velocity, and therefore the three-dimensional pre-format pattern has a shape, of an overhang-type in its height direction, as shown in a schematic sectional view of FIG. 4, wherein a projection 12 of the pre-format pattern is disposed on a die substrate 11, and a photoresist 14 is disposed on the projection 12. As a result, the side slope of the projection 12 of the pre-format pattern forms an angle of near 90 degrees with the die substrate 11.

In a process wherein an information recording medium substrate is produced by using such cast molding die, when the molded substrate is released from the cast molding die, there occurs a problem that the tracking groove portion or information pit portion of the substrate partially remains on the die, and particularly, the information pit portion partially lacks.

FIG. 5 is a schematic partial plan view showing a substrate obtained by cast molding using the above-mentioned conventional cast molding die, wherein a defect occurs in a pre-format 15. Particularly, in FIG. 5, at the edge portion of an information pit 17 which has been formed between tracking grooves 16 of the pre-format 15 in parallel with another tracking groove 16, a defect 18 such as a lack of an irregular shape, or a crack impairing the pit shape is formed.

As noted above, cause error at the time of reproducing the pre-format signal, thereby impairing the reliability of an information recording medium. Accordingly, the occurrence of such defect becomes a serious obstacle to the production of an information recording medium having a high reliability.

On the other hand, U.S. Pat. No. 4,230,915 discloses a technique comprising: forming a resist pattern having an angle of inclination by regulating the intensity distribution of a laser beam and the developing time for a photoresist; electroforming a stamper by using the resist pattern; and press-molding a record carrier by using the stamper, whereby the reproduction is easily released from the stamper. However, such production process for a stamper can provide an non-uniform resist pattern and further non-uniform stamper because of irregularity in intensity distribution of the laser beam and the development for the photoresist.

SUMMARY OF THE INVENTION

The present invention has been made in order to solve the above-mentioned problems encountered in the prior art, and a principal object of the present invention is to provide a cast molding die which can provide, by cast molding, an information recording medium substrate wherein the occurrence of a defect such as lack in the periphery of an unevenness pre-format is reduced.

Another object of the present invention is to provide a process for producing an information recording medium substrate, which uses the above-mentioned cast molding die.

According to the present invention, there is provided a cast molding die for an information recording medium, having a mold surface with a prescribed unevenness pattern comprising a projection; the projection having at least one pair of opposite side slopes each of which forms an acute angle with respect to the extension of the mold surface.

The present invention also provides a molding process, comprising:

providing a cast molding die having a mold surface with a prescribed unevenness pattern comprising a projection; the projection having at least one pair of opposite side slopes each of which forms an acute angle with respect to the extension of the mold surface;

supplying a raw material to the cast molding die in contact with the mold surface thereof;

hardening the raw material; and releasing the hardened raw material from the cast molding die thereby to form an information recording medium substrate.

Incidentally, in the case of the cast molding, originally, shrinkage accompanied by curing of a resin naturally causes release. However, in the prior art, it may be considered that the stress due to the shrinkage is concentrated in the neighborhood of the edge portion of the pit 17, thereby to cause a lack, etc.

On the contrary, in the present invention, it may be supposed that the above-mentioned sectional shape of the projection of the unevenness pre-format reduces a stress when the resinous substrate is released from the cast molding die, thereby to reduce the occurrence of a lack defect such as lack in the unevenness pre-format of the information recording medium substrate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1, 2 and 3 are schematic sectional views, each showing an embodiment of the cast molding die according to the present invention;

DETAILED DESCRIPTION OF THE INVENTION

Figure 4:
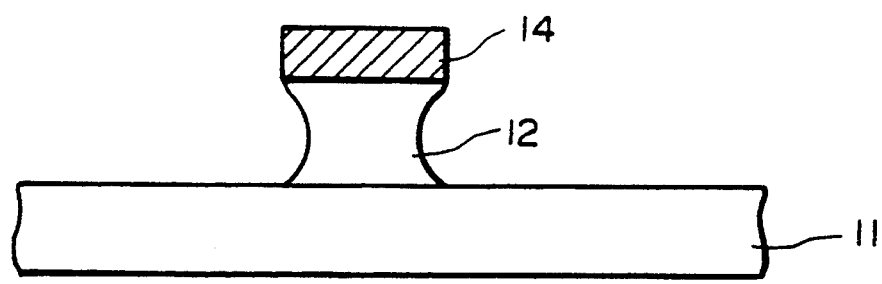
FIG. 4 is a schematic sectional view of a conventional die substrate produced by etching.
Figure 5:
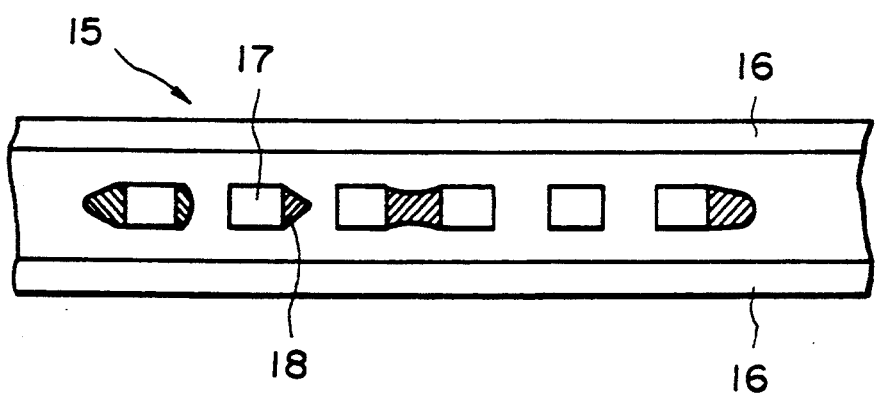
FIG. 5 is a partial schematic plan view showing a pre-format of a substrate obtained by using a conventional cast molding die.

Referring to FIG. 1, a schematic sectional view of the cast molding die according to the present invention, a projection pattern 2 is formed on a substrate 1, and the side slope 3 of the projection pattern 2 forms an angle of $\theta_1$ with the flat surface 4 of a cast molding die 5.

In the present invention, the angle $\theta_1$ between the side slope 3 of the projection pattern 2 and the flat surface 4 of the substrate 1 is less than 90 degrees, and may preferably be 60 degrees or less, more preferably 30 to 50 degrees. On the basis of such $\theta_1$, there may be reduced the occurrence of a defect such as lack in the tracking groove portion or information pit portion of an information recording medium substrate to be produced from the cast molding die 5.

In the present invention, the side slope 3 may monotonously ascend, i.e., the side slope 3 does not substantially have an overhang as shown in FIG. 4. However, the side slope 3 may have different inclination angles $\theta_2$ and $\theta_3$, as shown in FIGS. 2 and 3, as described hereinafter.

Incidentally, the reason for the occurrence of a defect such as lack at the time of cast molding has not been solved sufficiently up to the present. For example, it may be supposed that a stress based on curing shrinkage at the time of cast molding is present in a substrate, and such stress is concentrated on a minute pit of an unevenness pre-format formed on the substrate thereby to cause a defect. Therefore, we have controlled the curing process in various ways, but the probability of the defect occurrence is not substantially affected thereby.

According to our many investigations, it has rather been found that the shape of the indentation of an unevenness pre-format pattern such as a pit to be formed on a substrate is the cause of the occurrence of a defect such as lack. In other words, we have found that the occurrence of a defect can be suppressed when there is formed, on a substrate, an indentation of a pre-format with a three-dimensional shape wherein the size of the indentation gradually or stepwise decreases in the depth direction.

In order to prepare the above-mentioned cast molding die, there may be used the following processes: one wherein an unevenness pattern is formed on an ordinary glass plate by a photolithographic process; one wherein a substrate is patterned by use of laser beam machining such as cutting; one wherein an unevenness pattern is formed on a glass or metal plate by a direct-cutting method using a diamond needle with a point; etc.

Further, in the present invention, the material used for forming the unevenness pre-format pattern can be any of those capable of forming an unevenness pre-format. Specific examples thereof may include: metals such as Cr, inorganic oxides such as SiO and $SiO_2$, and inorganic nitrides such as TiN.

For example, a Cr film is formed on a glass plate and the Cr film is etched to form a pattern while regulating the selectivity coefficient between a photoresist and Cr (i.e., the ratio between the etching velocity for the photoresist and that of Cr), whereby the angle $\theta$ between the side slope 3 of the projection 2 of the unevenness pre-format, and the flat surface 4 of the substrate 1 may be changed in various ways.

More specifically, when Cr is subjected to dry etching by using an RIE (reactive ion etching) process, the selectivity coefficient between the photoresist and Cr may be regulated by changing the composition of a gas used for the etching, etc. Further, when Cr is etched by using an RIBE (reactive ion beam etching) process, the angle $\theta$ between the side slope of the Cr pattern and the substrate may be regulated by tilting the Cr film together with the substrate to obliquely supply an ion beam to the Cr film, or by preliminarily shaping the resist pattern so that the resultant pattern has a section in the form of a trapezoid.

In the present invention, the unevenness pattern comprises, e.g., one corresponding to a tracking groove or an information pit to be formed in the substrate for an information recording medium. The present invention is particularly suitable when a spiral tracking groove for an optical disk preferably having a width of 0.2-30 microns, more preferably 0.5-2 microns (particularly about 0.6 micron), and a pitch of 0.1-15.0 micron, more preferably 1.0-5 micron (particularly, about 1.6 micron); or parallel tracking grooves for an optical card preferably have a width of 1-10 microns, more preferably 2-5 microns (particularly, about 3 microns), and a pitch of 5-20 microns, more preferably 8-15 microns (particularly, about 12 microns); or minute information pits each in the form of a rectangle having a length of 10 microns or below and a width of 10 microns or below, or those in the form of an ellipse having a major axis of 10 microns or below are formed on a substrate for an information recording medium.

In the present invention, the planar shape of the projection corresponding to an information pit may be a quadrilateral, a circle, or an ellipse. In the case of the quadrilateral projection, it is preferred that two pairs of side slopes thereof disposed opposite to each other are inclined toward the outside of the projection with respect to the depth direction, i.e., the direction of from the upper surface of the projection 2 toward the flat surface 4 of the substrate 1.

In the present invention, as shown in FIG. 2 or 3, the projection 2 of an unevenness pre-format may 5 have a structure of two or more layers wherein at least one pair of the side slopes of the projection 2 disposed opposite to each other are respectively inclined gradually toward the outside of the projection 2.

For example, when the projection 2 of the unevenness pre-format has a two-layer structure as show in FIG. 2 or 3, the angle $\theta_1$ between the side slope of a first layer $3a$ formed on a substrate 1, and the flat surface 4 of a cast molding die 5; and the angle $\theta_2$ between the side slope of a second layer $3b$ formed on the first layer $3a$, and the flat surface 4 may preferably have a relationship of $\theta_2 \leq \theta_1 \leq 60$ degrees or $\theta_1 \leq \theta_2 \leq 60$ degrees, particularly 20 degrees $\leq \theta_2 \leq \theta_1 \leq 50$ degrees, or 20 degrees $\leq \theta_1 \leq \theta_2 \leq 50$ degrees.

Further, in a case where the projection of the unevenness pre-format has a structure of two or more layers, when the angle between the side slope of a first layer formed on a substrate 1, and the flat surface of a substrate 1 is represented by $\theta_1$; and the angle between the side slope of a second layer formed on the first layer, and the flat surface of the substrate is represented by $\theta_2$; ...; the angle between the side surface of an (n+1)-th layer formed on the n-th layer and the flat surface of the substrate 1 is represented by $\theta_k$ ($k \geq 2$); all of the angles $\theta_k, \theta_{k-1}, \theta_{k-2}, \ldots \theta_2, \theta_1$ may preferably be 60 degrees or smaller, particularly 20 degrees or larger and 50 degrees or smaller. In such embodiment, the largeness relationships among these angles cannot particularly be restricted, but these angles may preferably have relationships of $\theta_k < \theta_{k-1} < \theta_{k-2} \ldots < \theta_2 < \theta_1 \leq 60$ degrees, or $\theta_1 < \theta_2 \ldots < \theta_{k-2} < \theta_{k-1} < \theta_k \leq 60$ degrees, particularly, 20 degrees $< \theta_k < \theta_{k-1} < \theta_{k-2} \ldots < \theta_2 < \theta_1 \leq 50$ degrees or 20 degrees $< \theta_1 < \theta_2 \ldots < \theta_{k-2} < \theta_{k-1} < \theta_k \leq 60$ degrees.

In order to prepare the above-mentioned cast molding die, a projection-forming layer 3 comprising at least two layers $3a$ and $3b$ may be formed on a substrate 1 by using materials therefor respectively having different etching velocities, whereby the shape thereof, particularly the angles $\theta_1$ and $\theta_2$ may be controlled. When the side slope of the projection is stepwise inclined in such manner, the stress exerted at the time of curing of a resin may be dispersed more effectively.

In order to obtain the above-mentioned embodiment of a cast molding die, a plurality of thin layers may be disposed by using projection-forming materials having different etching velocities, such as metal, dielectric substance, and organic substance.

Further, when such thin layers comprise the same material, e.g., respectively comprise chromium alone, chromium oxide and chromium compound containing nitrogen, the etching velocities therefor are different. As a result, the above-mentioned molding die may be prepared by forming plural thin layers by use of such materials.

In the present invention, the thickness of the pattern-forming layer of the die may suitably be determined in consideration of the depth of the indentation of an unevenness pre-format to be formed on an information recording medium substrate, and the shrinkage ratio for a resin to be used. More specifically, the pattern-forming layer may preferably have a thickness of 300 to 5000 Å, more preferably 500 to 3000 Å.

In the present invention, a liquid transparent resin may be poured into the casting die prepared in the above-described manner, cured or hardened and then released from the die, according to an ordinary casting process, thereby to obtain an information recording medium substrate.

The liquid resin to be poured into the cast molding die according to the present invention may be a transparent uncured thermosetting resin, photo-curable (or photo-hardenable) resin, or a thermoplastic resin. Specific examples thereof may include: thermosetting resins such as phenolic resins, epoxy resins, and polyester resins; thermoplastic resins such as vinyl resins, styrene resins, acrylic resins, polycarbonate resins, vinyl acetate resins and polyester resins; etc.

As described hereinabove, there is provided a cast molding die having an unevenness pre-format pattern formed at its surface, wherein the projection of the pre-format pattern has a side shape such that its side slope is inclined toward the outside of the projection with respect to the thickness direction thereof. By using the above-mentioned cast molding die, an information recording medium substrate may smoothly be released from the molding die in a cast molding process, whereby a defect such as lack in the tracking groove portion or information pit portion of the information recording medium substrate may be prevented.

Further, according to the process for producing an information recording medium substrate of the present invention, there is provided an information recording medium substrate providing less read error and having a high reliability, and a defect in the unevenness pre-format such as tracking groove and information pit of the information recording medium substrate may be prevented.

Hereinbelow, the present invention will be explained more specifically with reference to examples.

EXAMPLE 1

A 3000 Å-thick chromium layer was formed on a 2.3 mm-thick glass substrate (13 cm×13 cm) by vacuum evaporation, and a photoresist (trade name: AZ-1370, mfd. by Hoechst Japan K.K.) was applied onto to the chromium layer to form a 1000 Å-thick photoresist layer. Then, the resultant substrate was exposed to light by the medium of a mask which had been formed corresponding to a pre-format, and developed to form a resist pattern.

A portion of the chromium film from which the photoresist had been removed was etched by a reactive ion etching process using an etching gas comprising $CCl_4$ and Ar by means of an etching device ECR-310E (mfd. by Anelva Co.). In the etching process, the selectivity coefficient between the photoresist and chromium was changed by changing the mixing ratio between $CCl_4$ and Ar, so that there were provided molding dies wherein the angle $\theta_1$ between the side slope of the chromium projection pattern and the flat surface of the die became 10 degrees, 30 degrees, 50 degrees, 60 degrees and 70 degrees, respectively. In the etching process, the pressure of the gas was 7 Pa and the flow rate thereof was 40 sccm (standard cubic centimeter per minute), and the RF power was 200 W.

The thus obtained molding die had a projection pattern for a tracking groove which had a width of 3 microns, a pitch of 12 microns and a height of 3000 Å; and a projection pattern for an address information pit which had a width of 3 microns, a length of 6 microns, a pitch of 6 microns and a height of 3000 Å.

Then, the thus obtained cast molding die was disposed opposite to a 3 mm-thick glass plate, as a mirror die, of which surface had been subjected to optical grinding, by the medium of a spacer, thereby to form a cast molding cell.

Into the cell, the following resin composition was poured, polymerized at 120° C. for 10 hours to be cured, and then released from the die.

| Resin Composition | |
|---|---|
| Methyl methacrylate | 70 wt. parts |
| Tertiary-butyl methacrylate | 25 wt. parts |
| Polyethylene glycol dimethacrylate (molecular weight: 620) | 5 wt. parts |

As a result, an information recording medium substrate in the form of a card (54 mm×85 mm) having a thickness of 0.4 mm and an unevenness pre-format.

The above-mentioned molding process was repeated 30 times to obtain 30 sheets of information recording medium substrates.

Each of the thus obtained information recording medium substrates were examined with the eye and an optical microscope (magnification: 400) to observe a defect such as lack in the periphery of the unevenness pre-format pattern, whereby the probability of occurrence of defects was determined. The thus obtained results are shown in Table 1 appearing hereinafter.

Each value shown in Table 1 is an average of probabilities of defect occurrence with respect to the respective 30 sheets of substrates obtained from each of 100 sheets of the dies. The probability of defect occurrence was determined in the following manner.

The substrate having an unevenness pre-format was prepared by using one die, and when one or more lack or crack occurred in the periphery of the unevenness pre-format pattern, the substrate was defined as a defective substrate. Based on such examination, the probability of defect occurrence was calculated according to the following formula:

$$\frac{\text{(number of defective substrates)}}{\text{(number of prepared substrates)}} \times 100 \, (\%)$$

EXAMPLE 2

On the surface of a glass substrate (13 cm×13 cm) with a thickness of 2.3 mm which had been subjected to precision grinding, a 2000 Å-thick layer of chromium oxide containing nitrogen, as a projection-forming material, was formed by sputtering by use of a target of Cr and an atmosphere of $N_2$ and $O_2$, and on the resultant chromium oxide layer, a 2000 Å-thick layer of chromium containing nitrogen was formed by sputtering by use of a Cr target and a atmosphere of $N_2$, to obtain a laminate layer.

Then, a photoresist pattern was formed on the chromium layer by a photolithographic process by using a photoresist AZ-1350 (mfd. by Hoechst Japan). The resultant photoresist layer was used as a mask and the laminate layer was subjected to wet-etching at room temperature for 120 sec. to obtain a molding die with an unevenness pattern having projections of 3 microns×6 microns in the laminate chromium layer. The etching liquid used herein was one obtained by adding pure water to a mixture comprising 165 g of ammonium cerium (IV) nitrate and 32 ml of a 80 wt. %-perchloric acid so that the total volume of the resultant solution became 1000 ml.

The three-dimensional shape of the projection of the thus formed pattern was one as shown in FIG. 3, wherein $\theta_1$ (25 degrees) < $\theta_2$ (30 degrees), because there were laminated two layers having different etching velocities.

The above-mentioned process was repeated to obtain 100 sheets of molding dies having the same shape.

Then, the thus obtained cast molding die was disposed opposite to a 3 mm-thick glass plate, of which surface had been subjected to optical grinding, by the medium of a spacer disposed in the periphery, thereby to form a cast molding device.

Into the device, the same liquid acrylic resin composition as that used in Example 1 was poured, polymerized at 120° C. for 10 hours to be cured, and then released from the die.

As a result, an information recording medium substrate for an optical card having a size of 54 mm×86 mm and a thickness of 0.4 mm was obtained.

Each of the thus obtained information recording medium substrates were examined with the eye and an optical microscope to observe the occurrence of a defect such as lack. The results are shown in Table 1 appearing-hereinafter.

EXAMPLE 3

A cast molding die having an unevenness pattern comprising rectangular projections of 3 microns×6 microns with a height of 0.3 micron as shown in FIG. 2 was prepared by etching in the same manner as in Example 2 except that a laminate layer was formed while changing the mixing ratio between nitrogen, and oxygen. In the thus obtained projection, $\theta_1$ (30 degrees)>$\theta_2$ (25 degrees) as shown in FIG. 2.

The above-mentioned process was repeated to obtain 100 sheets of molding dies having the same shape.

By using the thus prepared cast molding dies, information recording medium substrates were prepared in the same manner as in Example 2, and the resultant information recording medium substrates were examined to observe the occurrence of a defect such as lack. The results are shown in Table 1 appearing hereinafter.

COMPARATIVE EXAMPLE 1

A cast molding die was prepared in the same manner as in Example 1 except that the Cr film was etched so that the angle $\theta_1$ between the side slope of the resultant Cr projection and the flat surface of the resultant cast molding die became 90 degrees.

By using the thus prepared cast molding die, information recording medium substrates were prepared in the same manner as in Example 1, and the resultant information recording medium substrates were examined to observe the occurrence of a defect such as lack. The results are shown in the following Table 1.

TABLE 1

| Example | Angle between side slope of projection and flat surface in molding die | Probability of defect occurrence |
|---|---|---|
| Ex. 1 | 10 degrees | 5% |
| | 30 degrees | 10% |
| | 50 degrees | 25% |
| | 60 degrees | 35% |
| | 70 degrees | 50% |
| Ex. 2 | | 4% |
| Ex. 3 | | 9% |
| Comp. Ex. 1 | | 79% |

What is claimed is:

1. A method of producing a molding die for an information recording medium, having a mold surface with a prescribed unevenness pattern comprising a projection; said projection having different etching velocities along its projected thickness; said projection defining a pair of convergent opposite inclining side slopes, each slope of said pair forming an acute inclining angle with respect to an extension of said mold surface; said method comprising the steps of:

forming a pattern-forming layer on a substrate, said pattern-forming layer comprising a common metal element throughout the thickness of the pattern-forming layer and an additional element differing in composition from the common metal element in the thickness direction of the pattern-forming layer, the pattern-forming layer having an etching velocity which is variable in the thickness direction of the pattern-forming layer by varying a proportion of the common metal element with respect to the additional element; and etching the pattern-forming layer with an etchant having an unchanging composition to remove the pattern-forming layer selectively and to form said projection.

2. A method of producing a molding die for an information recording medium, having a mold surface with a prescribed unevenness pattern comprising a projection; said projection defining a pair of convergent opposite inclining side slopes, each slope of said pair forming an acute inclining angle with respect to an extension of said mold surface; said method comprising the steps of:

forming on a substrate a pattern-forming layer having a substantially uniform etching velocity in the thickness direction of the pattern-forming layer; and etching the pattern-forming layer according to a reactive ion etching process using an etchant gas while changing the etchant gas composition to remove the pattern-forming layer selectively and to form said projection.

3. A method according to claim 1, wherein said forming step is performed by sputtering by use of a target with an atmosphere around it, while changing said atmosphere around the target.

4. A method according to claim 1, wherein said forming step is performed by sputtering by use of a Cr target with an atmosphere around it, while changing said atmosphere around the target from $N_2$ and $O_2$ to $N_2$.

5. A method according to claim 2, wherein said etching step is performed using an etchant gas containing a mixture of $CCl_4$ and Ar, while changing the ratio of $CCl_4$ to Ar in said mixture.

* * * * *

UNITED STATES PATENT AND TRADEMARK OFFICE
CERTIFICATE OF CORRECTION

PATENT NO. : 5,389,313
DATED : February 14, 1995
INVENTOR(S) : HIROYUKI IMATAKI, ET AL.

It is certified that error appears in the above-indentified patent and that said Letters Patent is hereby corrected as shown below:

On the title page:

IN THE "RELATED U.S. APPLICATION DATA" [60]

Line 1, "Division of Ser. No. 811,900, Dec. 20, 1991," should read --Division of Ser. No. 811,900, Dec. 24, 1991,--.

COLUMN 1

Line 6, "Dec. 20, 1991," should read --Dec. 24, 1991,--.

COLUMN 2

Line 55, "As" should read --Such defect as--, and "cause" should read --causes--.

COLUMN 3

Line 1, "an" should read --a--.

COLUMN 5

Line 44, "show" should read --shown--.

COLUMN 7

Line 53, "pre-format." should read --pre-format was obtained.--.

UNITED STATES PATENT AND TRADEMARK OFFICE
CERTIFICATE OF CORRECTION

PATENT NO. : 5,389,313
DATED : February 14, 1995
INVENTOR(S) : HIROYUKI IMATAKI, ET AL.

It is certified that error appears in the above-indentified patent and that said Letters Patent is hereby corrected as shown below:

COLUMN 8

Line 57, "were" should read --was--; and
    Line 60, "pearing-hereinafter." should read --pearing hereinafter.--.

Signed and Sealed this

Thirteenth Day of June, 1995

Attest:

BRUCE LEHMAN

Attesting Officer      Commissioner of Patents and Trademarks